(12) United States Patent
Jagiella

(10) Patent No.: US 10,036,659 B2
(45) Date of Patent: Jul. 31, 2018

(54) METHOD FOR FUNCTION SETTING OF A MEASURING POINT AND MEASURING POINT

(71) Applicant: Endress + Hauser Conducta Gesellschaft für] Mess- und Regeltechnik mbH + Co. KG, Gerlingen (DE)

(72) Inventor: Manfred Jagiella, Notzingen (DE)

(73) Assignee: Endress+Hauser Conducts GmbH+Co. KG, Gerlingen (DE)

( * ) Notice: Subject to any disclaimer, the term of this patent is extended or adjusted under 35 U.S.C. 154(b) by 930 days.

(21) Appl. No.: 14/519,349

(22) Filed: Oct. 21, 2014

(65) Prior Publication Data

US 2015/0120231 A1    Apr. 30, 2015

(30) Foreign Application Priority Data

Oct. 24, 2013    (DE) .......................... 10 2013 111 714

(51) Int. Cl.
*G01D 18/00* (2006.01)
*G01D 21/00* (2006.01)

(52) U.S. Cl.
CPC ........... *G01D 18/002* (2013.01); *G01D 18/00* (2013.01); *G01D 21/00* (2013.01)

(58) Field of Classification Search
CPC ....... G01D 18/002; G01D 18/00; G01D 21/00
See application file for complete search history.

(56) References Cited

U.S. PATENT DOCUMENTS

| | | | |
|---|---|---|---|
| 5,710,552 A | 1/1998 | McCoy | |
| 6,045,260 A * | 4/2000 | Schwartz | ................. G01K 7/13 374/1 |
| 7,120,391 B2 | 10/2006 | Stengele | |
| 7,587,953 B2 | 9/2009 | Wittmer | |
| 2004/0153594 A1* | 8/2004 | Rotvold | ............. G05B 19/4186 710/305 |
| 2010/0145476 A1* | 6/2010 | Junk | .................... G05B 19/042 700/7 |

(Continued)

FOREIGN PATENT DOCUMENTS

| | | |
|---|---|---|
| CN | 101432595 A | 5/2009 |
| CN | 102667652 A | 9/2012 |

(Continued)

OTHER PUBLICATIONS

German Search Report, German PTO, Munich, dated Feb. 7, 2014.

*Primary Examiner* — Manuel L Barbee
(74) *Attorney, Agent, or Firm* — Christopher R. Powers; PatServe

(57) ABSTRACT

A measuring point and method for function setting of a measuring point of process automation technology, wherein the measuring point comprises at least one sensor and a transmitter circuit. The sensor is connected via the transmitter circuit with a superordinated data processing system. The method comprises steps as follows: disconnecting the sensor from the transmitter circuit; connecting a mobile unit with the transmitter circuit and transferring parameters from the mobile unit into the transmitter circuit; disconnecting the mobile unit; connecting a, or the, sensor with the transmitter circuit; and transferring at least one parameter from the transmitter circuit into the sensor.

17 Claims, 3 Drawing Sheets

(56) References Cited

U.S. PATENT DOCUMENTS

2010/0306567 A1* 12/2010 Seiler ................ G05B 19/4185
                                                                 713/330

FOREIGN PATENT DOCUMENTS

| CN | 103185601 A | 7/2013 |
|----|----|----|
| DE | 10032774 A1 | 1/2002 |
| DE | 102005017693 A1 | 10/2006 |
| DE | 102009028794 A1 | 2/2011 |
| EP | 2407776 A1 | 1/2012 |
| WO | 2005031339 A1 | 4/2005 |

* cited by examiner

METHOD FOR FUNCTION SETTING OF A MEASURING POINT AND MEASURING POINT

TECHNICAL FIELD

The invention relates to a method for function setting of a measuring point of process automation technology. The invention relates also to a measuring point.

BACKGROUND DISCUSSION

In process automation technology, especially for automation of chemical processes or procedures for producing a product from a raw or starting material by the use of chemical, physical or biological processes and/or for control of industrial plants, measuring devices installed near to the process, so-called field devices, are applied. Field devices embodied as sensors can monitor, for example, process measurement variables, such as pressure, temperature, flow, fill level or measured variables of liquid- and/or gas analysis, such as, for example, pH-value, conductivity, concentrations of certain ions or chemical compounds and/or concentrations or partial pressures of gases.

Used in a process installation are frequently a large number of the most varied of sensors. A sensor arranged at a certain location of installation in a process, for example, a sensor installed at a certain location of installation, and embodied for registering one or more measured variables, forms together with a measurement transmitter (which also may be referred to just as the transmitter for short) a measuring point.

A sensor includes, as a rule, a measuring transducer, which is embodied to register the measured variable to be monitored and to produce an electrical measurement signal correlated with the current value of the measured variable. Serving for additional processing of the measurement signal is an electronic circuit, which is embodied to condition the electrical measurement signal further, for example, to digitize it, and to convert it into a measured value of the measured variable and/or into a variable derived from the measured value, and, in given cases, to output such to a superordinated unit. The circuit can include, besides the measured value formation and measured value forwarding, more extensive functions. For example, it can be embodied to perform a more extensive evaluation of the measured values or to perform sensor diagnostics, in the case of which a current state of the sensor is determined and/or a prediction made of the remaining life of the sensor. The circuit can be arranged entirely or partially in the transmitter.

In the case of sensors of the aforementioned type, the particular circuit is frequently connected with a superordinated data processing system, which is arranged most often spatially removed from the respective measuring point and to which the measured values produced by the respective sensor, diagnostically relevant data or other sensor data are forwarded. The superordinated data processing system can especially comprise one or more electronic, process controllers, for example, one or more measurement transmitters installed on-site, a process control computer, computers at a control station or a programmable logic controller (PLC).

Serving frequently for data transmission in such industrial measuring arrangements, at least sectionally, are fieldbus systems, such as, for example, FOUNDATION Fieldbus, PROFIBUS, ModBus, etc. or, for example, also networks based on the Ethernet standard, as well as the corresponding, most often application independent, standardized, transmission protocols.

Known from Published International Application WO 2005/031339 is a liquid sensor, which is connected via a coupling with a measurement transmitter and further with a superordinated data processing system. The sensor includes a measuring transducer and a sensor circuit, which has a preprocessing circuit for preprocessing the analog measurement signals produced by means of the measuring transducer, an analog/digital converter for converting the registered analog measurement signals into digital measurement signals and a first interface for transmitting the digital measurement signals to the superordinated measurement transmitter. The coupling includes a sensor side, primary coupling element and a thereto complementary, secondary coupling element, which is connected with the measurement transmitter. The first interface is embodied to transfer the digital measurement signals via the coupling to the measurement transmitter. The secondary coupling element includes another electronic circuit, which has a second interface complementary to the first interface, which is embodied to receive the measuring signals transmitted from the first interface. The second interface can, moreover, transmit data as well as energy via the coupling to the first interface of the sensor. The transmission of energy and data occurs in the case of the sensor known from WO 2005/031339 contactlessly by means of an inductive coupling of the first and second interfaces. This assures also a galvanic decoupling of the sensor from the measurement transmitter.

Measurement transmitters conventionally have display means, e.g. a display, and input means, e.g. in the form a keyboard or one or more rotate/press switches, by means of which a user can interact with the measurement transmitter, i.e. read measured values and sensor data, respectively input parameters or commands.

More recently, measuring arrangements have become known, which do without a conventional measurement transmitter equipped with the input- and display means. Described in German Patent DE 10 2011 107 717 is a sensor for liquid- or/and gas analysis, which is connected with a measuring- or/and transmitter circuit, respectively with a superordinated control system. The sensor includes a sensor housing, in which circuit means for registering, conditioning and forwarding measured values to the measuring- or/and transmitter circuit, respectively to the control system, are provided. This circuit means includes an analog sensor electronics, an analog/digital converter for converting the registered analog, measured values into digital, measured values, a calculating unit and communication means for preparing and forwarding the digital, measured values to the measuring- or/and transmitter circuit, respectively to the control system, according to a standard communication protocol of process technology, for example, a HART, PROFIBUS PA, PROFIBUS DB or Foundation Fieldbus protocol. Goal of the sensor construction illustrated in DE 10 2011 107 717 is to integrate as much of the electronics as possible into the sensor. Thus, the sensor electronics arranged in the sensor housing serves not only for registering and, in given cases, digitizing the measured values registered by a measuring transducer of the sensor, but also for additional processing and conversion of the measured values into a standard communication protocol usable by the control station.

Sensors used for liquid- and/or gas analysis must, as a rule, from time to time during their lifetime, undergo maintenance, especially be calibrated or regenerated. To this end, frequently the sensor to be maintained is removed from the measuring point and the maintenance measure performed at another site, for example, in the laboratory. In the intervening times, the measuring point can be operated further with another sensor of the same type. The lifetime of sensors for liquid- and/or gas analysis is, moreover, limited, depending on the particular features of the measuring point, and can extend, for example, from few days to a number of months. This leads to the fact that the sensors of a measuring point must regularly be replaced. A disadvantage of a measuring arrangement, wherein as much electronics as possible is accommodated in the sensor, is that, in the case of each sensor replacement, not only data stored in the sensor, but also measuring point specifically adapted parameters and measuring location specific program code get removed from the measuring point along with the sensor that is being replaced. These parameters, respectively such program code, must each time be made available to the replacement sensor.

The terminology "parameter" means herein an actuating- or influencing variable, which affects the sensor and, thus, changes the behavior of the sensor or delivers information concerning the state of the sensor.

SUMMARY OF THE INVENTION

An object of the invention is to provide function settings of a measuring point, in the case of a replaced individual component of the measuring point, to the replacement component.

The object is achieved by a method for function setting of a measuring point of process automation technology, wherein the measuring point comprises at least one sensor and a transmitter circuit, wherein the sensor is connected via the transmitter circuit with a superordinated data processing system, wherein the method comprises steps as follows: Disconnecting the sensor from the transmitter circuit; connecting a mobile unit with the transmitter circuit and transferring parameters from the mobile unit into the transmitter circuit; disconnecting the mobile unit; connecting a, or the, sensor with the transmitter circuit; and transferring at least one parameter from the transmitter circuit into the sensor.

Two modes can be used for transferring parameters. Either the transferring happens automatically directly after connection of the mobile unit to the transmitter circuit or the transferring must be started by a user. In an advantageous embodiment, the user must first authenticate itself for this. In both cases, before the complete transferring of the parameters, the correctness of currently present parameters is checked, so that, in given cases, only a portion need be transferred.

At least one parameter is transferred. It can concern, for instance, the sensor type (thus pH, conductivity, etc.). In an embodiment, all parameters are transferred. Alternatively, another option is that all parameters remain in the transmitter circuit and are utilized by the transmitter circuit, in order, for instance, to win the measured values from the raw measurement data.

In an embodiment, the transmitter circuit has no display- or interaction elements. In an alternative embodiment, the transmitter circuit includes a simple display element, for instance, an LED, which can give simple responses and indications. In an additional embodiment, the transmitter circuit includes a display, which constrained by the dimensions (see below), can display certain values, for example, the current measured value.

The transmitter circuit has approximately the dimensions of the sensor. In an embodiment, at least one portion of the sensor is embodied cylindrically with a diameter between 10 mm and 20 mm, especially preferably, for instance, 12 mm.

In a preferred form of embodiment, before transfer from the mobile unit to the transmitter circuit, the parameters are checked against a database. Thus, that the data is up-to-date can always be assured. The database is, for example, stored in a server and managed via a corresponding access computer.

In an advantageous embodiment, a software- and/or firmware update of the transmitter circuit and/or of the sensor is performed via the mobile unit. The software- and/or firmware update of the sensor is, in such case, only indirectly performed. The data of the software- and/or firmware update are first transferred to the transmitter circuit. Then the sensor is re-connected and the update performed.

Preferably, the transmitter circuit is connected with the superordinated data processing system via a fieldbus and the fieldbus address of the transmitter circuit is set via the mobile unit.

Other options would include a parametering via the fieldbus. However, it is disadvantageous to have to use the control of the superordinated data processing system.

In an advantageous embodiment, parameters are transferred from a first transmitter circuit to a second transmitter circuit. Thus a replacement of a transmitter circuit can be performed, without losing parameters. The parameter transfer occurs in simple manner and via already present devices.

The object is further achieved by a measuring point, comprising: A sensor of process automation technology embodied to produce a measurement signal correlated with a measured variable and to output the measurement signal via a first interface; a transmitter circuit having a second interface complementary to the first interface and releasably connected with the first interface, wherein the transmitter circuit is connected with the sensor, wherein the transmitter circuit further includes at least one memory and a third interface, wherein the third interface is embodied for connection to a superordinated data processing system; and a mobile unit having a fourth interface complementary to the second interface and connectable with the second interface, wherein the mobile unit further includes at least one parameter memory for storing parameters, wherein the mobile unit is embodied for transferring the parameters in the parameter memory to the memory in the transmitter circuit, and/or wherein the mobile unit is embodied for receiving parameters and storing the parameters in the parameter memory.

Preferably, the mobile unit checks the parameter memory against a database, especially via the fourth interface, a USB connection or via a wireless connection, before transferring to the transmitter circuit.

In an advantageous form of embodiment, the parameters are actuating- and/or influencing variables of the sensor, especially measuring-point-specific data, especially sensor type, serial number, measurement frequency, measurement time, measuring interval, cleaning cycle, number of permitted cleaning cycles, sterilization cycle, number of permitted sterilization cycles, measured value, input signal, output signal, energy supply, electrical current distribution, tag number, accounting data, cost center, forwarding capable parameters for the superordinated data processing system, or access rights. This is not an exclusive listing. In general, of concern are measuring-point-specific data required for an efficient and correct measuring at the corresponding measuring point.

In an advantageous form of embodiment, the mobile unit is embodied for performing a software- and/or firmware update of the transmitter circuit and/or of the sensor.

The transmitter circuit is embodied to process a measurement signal delivered from the sensor further, especially to determine, based on the measurement signal, a measured value of the measured variable to be monitored by the measuring point, and to encode the measured value in a communication protocol, which is forwardable via the third interface. Thus, also the superordinated data processing system has access to the measurement signal.

Preferably, the sensor and the transmitter circuit are connected with one another by means of a releasable, plugged connection for transmission of data and energy.

In such case, the plugged connection includes a sensor side, primary coupling element and a thereto complementary, transmitter circuit side, secondary coupling element, and wherein the secondary coupling element has a housing, in which the transmitter circuit is arranged.

The housing has, for instance, the dimensions of the sensor. In an embodiment, at least one portion of the sensor is embodied cylindrically with a diameter between 10 mm and 20 mm, especially preferably, for instance, 12 mm.

Preferably, at least the first interface, second interface and fourth interface are galvanically isolated. Especially, they are embodied as inductive interfaces. Galvanic isolation provides advantages as regards corrosion protection, potential isolation, preventing mechanical wear of the plug, etc.

In an advantageous embodiment, the third interface is embodied as a fieldbus interface, and transfers data, especially the further processed, measured values, from the transmitter circuit via a fieldbus as a signal according to a protocol, which meets one of the standards, HART, PROFIBUS PA, PROFIBUS DB, Foundation Fieldbus, ModBus.

It is advantageously provided that the mobile unit sets the fieldbus address of the transmitter circuit.

Alternatively or supplementally, the third interface is embodied to transfer data, especially the further processed, measured values, from the transmitter circuit as a 4.20 mA signal.

Preferably, the mobile unit is embodied for use in an Ex region.

In an advantageous form of embodiment, the mobile unit includes a communication interface for a radio network, such as WLAN, GSM, GPRS, EDGE, UMTS, USDPA, LTE.

In an additional preferred embodiment, the transmitter circuit supplies the mobile unit with energy.

As another embodiment for transferring parameters from the mobile unit, the transmitter circuit can be populated with parameters in a process remote environment. In this regard, the transmitter circuit is connected via the second interface to a computer or the like, for example, via a corresponding interface, especially a USB interface corresponding to the second interface. The transmitter circuit is then also supplied with energy n this way. Alternatively, the energy supply can occur via the mobile unit.

BRIEF DESCRIPTION OF THE DRAWINGS

The invention will now be explained in greater detail based on the appended drawing, the figures of which show as follows.

Figure 1:
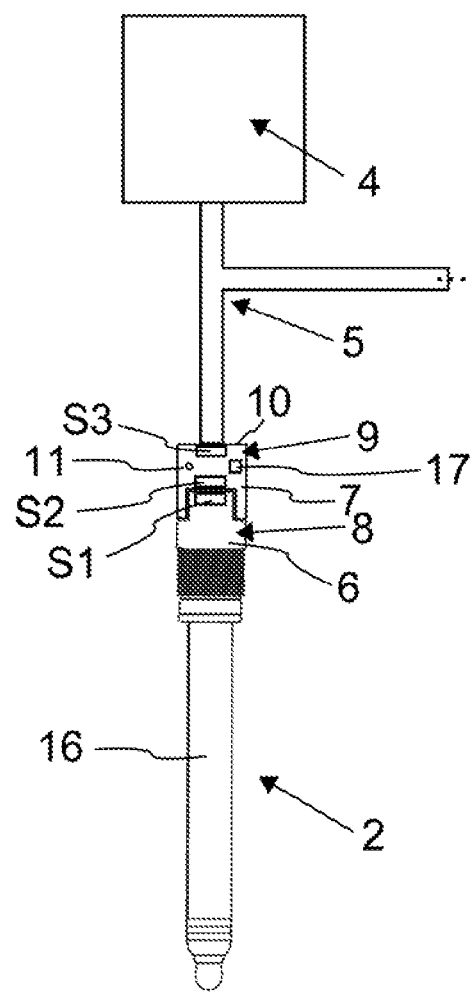
FIG. 1 is a sensor including transmitter circuit in a first embodiment.

In the figures, equal features are provided with equal reference characters.

DETAILED DESCRIPTION IN CONJUNCTIONS WITH THE DRAWINGS

Shown schematically in FIG. 1 is a sensor 2. Sensor 2 includes a measuring transducer 16 and connected fixedly with the measuring transducer 16 a sensor side, primary coupling element 6, which has a housing, in which a sensor circuit 8 is accommodated. Sensor 2 is, for example, a sensor of process automation technology, for example, a pH-sensor (shown in FIG. 1) or some other sensor for process measurement variables to be measured, variables such as pressure, temperature, flow, fill level or other measured variables of liquid- and/or gas analysis, such as, for example, conductivity, concentrations of certain ions or chemical compounds and/or concentrations or partial pressures of gases.

Sensor circuit 8 includes especially a first interface S1, via which the sensor 2 can transfer a measurement signal to a second, interface S2 complementary to the first interface S1 in a transmitter circuit 9 accommodated in the secondary coupling element 7. Secondary coupling element 7 includes a second housing 10, which surrounds the transmitter circuit 8, especially liquid tightly, and so protects against environmental influences. In the example of an embodiment in FIG. 1, the housing 10 is embodied as a hollow cylinder with an outer diameter of greater than 10 mm and less than 20 mm. Housing 10 can be produced, for example, as an injection molded part of a synthetic material, e.g. a plastic. Housing 10 can be embodied as part of a cable. Housing 10, respectively the transmitter circuit 9, forms then an end piece of the cable.

Also the housing of the sensor side, coupling element 6 is liquid tightly constructed and thus protects the sensor circuit 8 against environmental influences. Transmitter circuit 9 is embodied as an electronic circuit, which can be arranged within the housing of the secondary coupling element 7 on a circuit board, especially a multi-ply, circuit board, a flexible circuit card or a rigid-flex circuit card. Transmitter circuit 9 further includes at least one memory 17. The transmitter circuit 9 does not have its own display, nor does it have an input means. An exception is the LED 11 (see below), via which, however, no complex displays are possible.

Transmitter circuit 9 is connected with a superordinated data processing system 4, which can be, for example, a universal, process control system, especially a PLC. The connection can be implemented, for example, by means of a fieldbus 5. Other options, in such case, include both a wired connection as well as also a wireless connection. For transfer of data from the transmitter circuit 9 to the superordinated data processing system 4 via the fieldbus 5, respectively for receiving data from the superordinated data processing system 5 by the transmitter circuit 9, the transmitter circuit includes a third interface S3. Sensor 2, including the sensor circuit 8, as well as the transmitter circuit 9 are supplied with energy by the superordinated data processing system 4 via the third interface S3.

Data communication between the transmitter circuit 9 and the superordinated data processing system 4 occurs by means of a communication protocol processable by the superordinated data processing system 4, for example, by means of a standard fieldbus communication protocol, such as HART, PROFIBUS PA, PROFIBUS DB, Foundation Fieldbus, ModBus. If connection 5 is implemented as a wireless connection, communication can occur, for example, according to the wireless HART standard.

In the present example, interface S3 is embodied to enable communication of the transmitter circuit with the superordinated unit via a HART signal and includes a two-conductor, electrical current output. Equally, the here described invention can, however, also be implemented with a measuring arrangement, in the case of which the transmitter circuit utilizes a four-conductor, electrical current output and in the case of which communication occurs by means of a HART signal or by means of one of the other mentioned, standard fieldbus communication protocols. Alternatively to a connection to a fieldbus, the transmitter circuit 9 can provide a 4.20 mA signal for the superordinated data processing system 4, respectively receive a 4.20 mA signal from the superordinated data processing system 4.

The pluggable connector coupling formed by the coupling elements 6 and 7 is embodied in the present example as an inductive coupling. The coupling parts comprise, in each case, a coil, between which energy and data can be inductively transferred. This has the advantage that the pluggable connector coupling simultaneously assures a galvanic isolation of the sensor 2 from the superordinated data processing system 4, respectively the transmitter circuit 9. Alternatively, the pluggable connector coupling can, however, also be embodied as a galvanically coupling, plugged connection. In this case, it is advantageous to provide galvanic isolation within the sensor circuit 8 or within the electronic circuit forming the transmitter circuit 9.

Secondary coupling element 7 includes an optical display 11, which can comprise e.g. an LED, for visual display of a state of the communication connection formed via the pluggable connector coupling established by the coupling elements 6, 7.

The display can be embodied, for example, as a multi-colored LED. In this case, a color corresponds to a certain state of the communication connection. In a variant, optical display 11 can also serve to indicate sensor states, e.g. a sensor defect, or other system states. It is also possible to use only a single color LED. In this case, blink frequencies can serve to distinguish different system- or communication states. For energy—as well as space reasons, the optical display 11 uses no more complex display elements. In an embodiment, the transmitter circuit 9 includes a simple (i.e. small and energy saving) display, which can display just certain values, for example, the current measured value. In an embodiment, no interaction elements, such as keys, pushbutton switches, printer, etc. are integrated in the coupling element.

Without explicitly showing such in the figures, the internal construction of the coupling elements 6 and 7 with the therein arranged circuit components of the sensor circuit 8 and of the transmitter circuit 9 with be explored briefly here:

Sensor circuit 8 includes an analog measurement circuit, which produces in interaction with the measuring transducer 16 an analog measurement signal in the form of a measurement voltage or measurement current. The measurement signal is digitized by an analog/digital converter and output to a first microprocessor, which is embodied to prepare the measurement signal for transfer via the interface S1 to the interface S2 of the transmitter circuit 9. The first microprocessor includes an internal memory. Moreover, the sensor circuit 8 can include at least one additional memory, which the first microprocessor can access. Contained in this memory can be especially sensor-specific parameters, e.g. up-to-date calibration parameters, e.g. the parameters zero-point and slope characterizing a sensor characteristic curve, as well as the states of counters. Transmitter circuit 9 includes a second microprocessor, which is embodied, among other things, to calculate from the measurement signal a measured value of the measured variable.

The second microprocessor includes at least one internal memory 17. Durably stored in memory 17 are configuration data or other sensor or measuring point data, which can change during the lifetime of the sensor 2. The microprocessor is connected, moreover, via the interface S3 to the superordinated data processing system 4.

Figure 2:
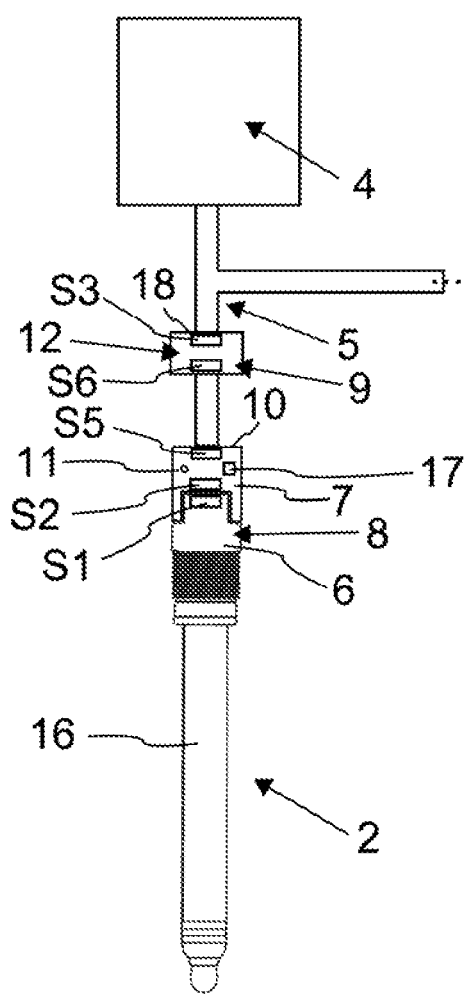
FIG. 2 is a sensor including transmitter circuit in a second embodiment.

FIG. 2 shows a further example of an embodiment, which includes a sensor 2, a coupling element 7 releasably connected with the sensor 2 and a compact transmitter 12 comprising a transmitter circuit 9, which is connected with a superordinated data processing system 4, which here is embodied as a control system.

Sensor 2 includes a measuring transducer 16 as well as, contained in the primary side, coupling element 6, a sensor circuit 8, which includes a first interface S1. The secondary coupling element 7 includes a circuit (not described in greater detail), which includes a second interface S2, complementary to the first interface S1, and a further, fifth interface S5. The circuit is embodied especially to receive signals from the sensor 2 obtained via the interface S2, in given cases, to condition them and to forward them via the interface S5 to the compact transmitter 12 as well as to receive signals obtained from the compact transmitter 12 via the interface S5, in given cases, to condition them and to forward them via the interface S2 to the sensor circuit 8. The interfaces S1 and S2 are, such as in the example of an embodiment presented in FIG. 1, embodied as inductive interfaces and the coupling elements 7 and 9 are embodied as a releasable, plugged connection.

The connection between the interface S5 of the coupling element 7 and the thereto complementary sixth interface S6 of the compact transmitter 12 is embodied in the example shown here as a fixed cable connection. Compact transmitter 12 includes a housing 18, which in the present example is embodied as a hollow cylinder with an outer diameter of greater than 10 mm and less than 20 mm. Housing 18 can be produced, for example, as an injection molded part of a synthetic material, such as a plastic. Housing 18 can be embodied as a part of a cable. Housing 18, respectively the transmitter circuit 9, forms then either an endpiece of the cable or is integrated into an intermediate section of the cable.

Compact transmitter 12 in a first embodiment utilizes neither a display nor an interaction means. In an additional embodiment, the compact transmitter 12 includes an optical display element (not shown) similar to the optical display element 11 of the transmitter circuit 9, thus, for instance, an LED. The functionality of the optical display element arranged on the compact transmitter 12 corresponds to that of the optical display element 11 on the transmitter circuit 9. For energy as well as space reasons, the optical display 11 involves no more complex display. In an embodiment, compact transmitter 12 includes a simple (i.e. small and energy saving) display, which can display limited information, for example, the current measured value. In an embodiment, no interaction elements, such as a key, pushbutton switch, printer, etc., are integrated in the coupling element. In an additional embodiment, one or more interaction elements can be arranged on the compact transmitter 12.

Arranged in the housing of the compact transmitter 12 is the transmitter circuit 9, which serves for determining a measured value from a measurement signal transferred from the sensor 2 via the plugged connection, as well as, in given cases, for additional processing of the measurement signal and for forwarding the measurement signal, respectively the further processed measurement signal, to the superordinated data processing system 4. Transmitter circuit 9 corresponds in construction and function to the transmitter circuit 9 described based on the first example of an embodiment according to FIG. 1. Transmitter circuit 9 is connected with the superordinated data processing system 4 via a fieldbus 5. Alternatively to a fieldbus connection, the transmitter circuit 9 can provide, respectively receive, a 4.20 mA signal for communication with the superordinated data processing system 4.

An advantage of this embodiment compared with the example of an embodiment illustrated in FIG. 1 is that the transmitter circuit 9 is accommodated in the compact transmitter 12 instead of in the secondary coupling element 7. This permits the housing of the coupling element 7 to be relatively small, so that the sensor 2 with the pluggable connector coupling composed of the primary and secondary coupling elements 6, 7 can be accommodated in most conventional assemblies, especially retractable assemblies. In spite of this, the total structure remains, as a whole, compact, due to the small housing dimensions of the compact transmitter 12.

For maintenance of the sensor 2, such can be removed from the transmitter circuit 9 by releasing the plugged connection, whereupon sensor 2 is brought to another site, e.g. a laboratory, where it is subjected to maintenance and/or calibrated. A replacement sensor of the same sensor type connected with the transmitter circuit 9 during this time can be immediately operated by means of the transmitter circuit 9 without other parametering or other measures being required, since the parameters are stored in the transmitter circuit 9, respectively in its memory 17 (see below). In the calibrating in the laboratory, the updated calibration data, especially zero-point and slope of a (linear) sensor characteristic curve, can be stored in a memory of the first microprocessor of the sensor circuit 8. Upon connection of the sensor 2 to the transmitter circuit 9 by means of the plugged connection, the second microprocessor can via the second interface load the updated calibration data and store such in the second memory, so that it is available for calculating measured values from the measurement signals of the sensor 2. Also, other sensor data, especially diagnostically relevant data, can, in this way, be provided to the transmitter circuit 9 from the sensor circuit 8.

For accurately measuring a process variable, certain parameters must be set in the sensor. In the sense of this invention, the terminology "parameters" means mainly measuring-point-specific data. A nonexclusive list includes sensor type, serial number, measurement frequency, measurement time, measuring interval, cleaning cycle, number of permitted cleaning cycles, sterilization cycle, number of permitted sterilization cycles, measured value, input signal, output signal, energy supply, electrical current distribution, tag number, accounting data, cost center, parameters capable of forwarding to the superordinated data processing system, access rights, etc.

As already mentioned, the transmitter circuit 9 has no display or interaction means. If a number of sensors are connected to the superordinated data processing system 5, then a parametering of the sensor 2 via a 4.20 mA signal cannot be done. Even in the case of a connection of the sensor 2 to a fieldbus, it is not desirable to meddle in the control by the superordinated data processing system 5, in order to parameter the sensor 2.

Figure 3:
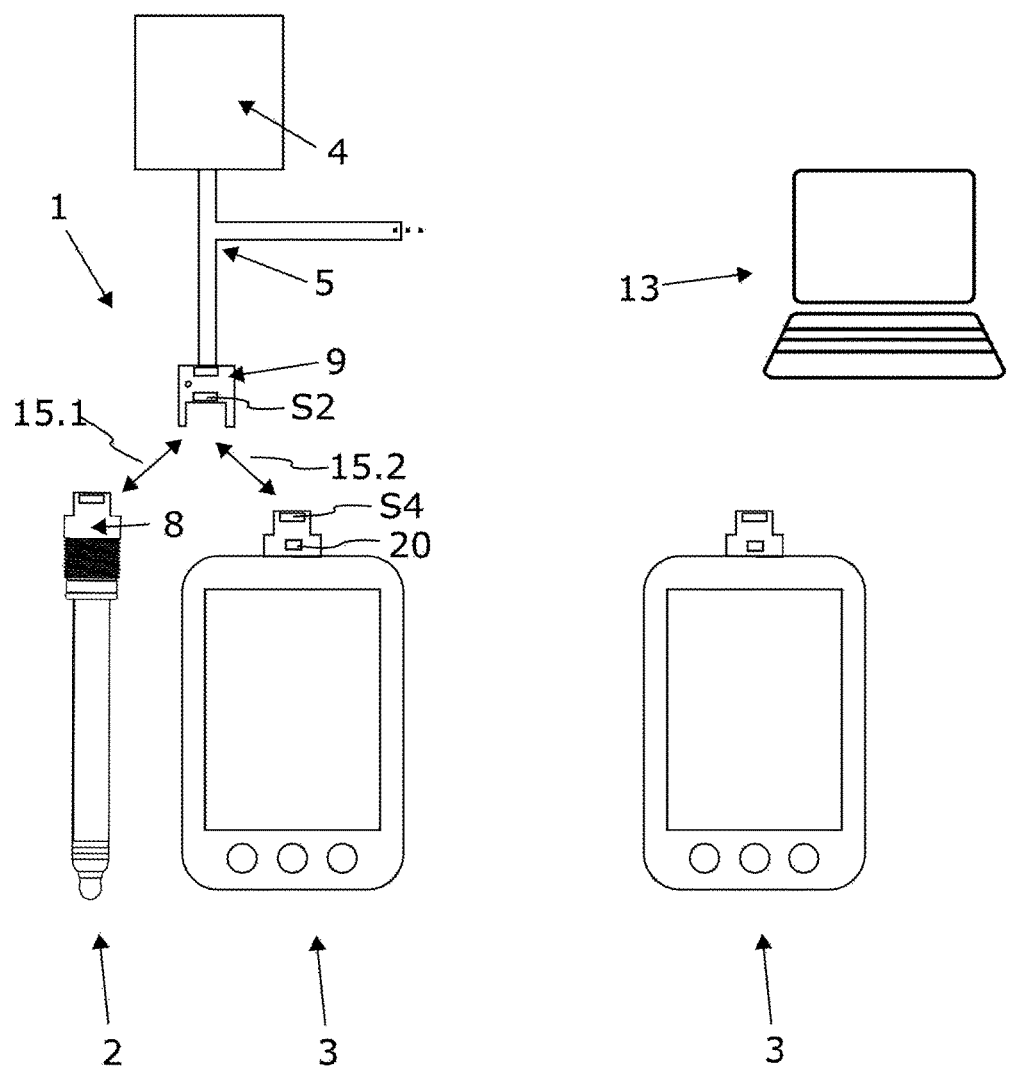
FIG. 3 is a schematic diagram of the method of the invention.

FIG. 3, consequently, illustrates schematically the method of the invention for measuring point 1 of the invention. Measuring point 1 includes a sensor 2 such as above described, including sensor circuit 8. As already mentioned, sensor 2 is pluggable to the transmitter circuit 9. Additionally, measuring point 1 includes a mobile unit 3. The mobile unit 3 includes a fourth interface S4, which is embodied to be complementary to the second interface S2, and a parameter memory 20. Interface S4 is constructed in this embodiment likewise as a galvanically isolated interface, for instance, an inductive interface.

Mobile unit 3 is in an embodiment suitable for use in a region, which requires Ex measures. Mobile unit 3 is, for example, a handheld (such as, for example, the handheld available from the Endress+Hauser group of firms under the mark, Field Xpert), a smart phone, a tablet PC, a notebook, or other portable minicomputer. Mobile unit 3 includes a communication interface to a radio network, such as WLAN, GSM, GPRS, EDGE, UMTS, USDPA, LTE. Moreover, the mobile unit 3 includes a Bluetooth interface, especially version 4.0. The mobile unit 3 is embodied for communication per Bluetooth Low Energy (BLE). In an embodiment, also communication via Near Field Communication (NFC) provides an option.

As first method step 15.1, sensor 2 is disconnected from the transmitter circuit 9. Then, the mobile unit 3 is connected to the transmitter circuit 9 in step 15.2. Following this, parameters can be transferred from the parameter memory 20 into the memory 17 of the transmitter circuit 9. In such case, two different modes provide options. Either the transfer happens automatically directly after connection of the mobile unit 3 to the transmitter circuit 9 or the transfer must be initiated by a user. In an advantageous embodiment, the user must first authenticate itself for this, for example, by a password, by having a certain key (for instance, via a dongle) or by a biometric feature. In all cases, before complete transfer of the parameters, whether the parameters already present in the memory 17 of the transmitter circuit 9 are up-to-date can be checked, so that, in given cases, only a portion needs to be transferred.

In a variant, all parameters remain in the transmitter circuit 9. Preferably, however, at least one parameter is transferred to the sensor 2. In an embodiment, the at least one parameter is the sensor type. After each new connection of a sensor 2, the transmitter circuit 9 queries the sensor type. The sensor 2 answers, thus, with pH, conductivity, temperature, pressure, etc. After each disconnection, thus, an initializing takes place, which includes at least the described retrieval of the sensor type. Other parameters that can be queried in the case of initializing include, for instance, serial number or tag number, via which the sensor 2, respectively the transmitter circuit 9 can, for example, be uniquely identified in a database. The database 13 contains other information for this sensor, for example, the number of already performed cleaning cycles or the maximum allowable number of cleaning cycles. In an additional embodiment, an option is that greater than one parameter, for example, all parameters, are transferred.

Before transfer of the parameters to the transmitter circuit 9, the mobile unit 3 compares the parameters in the parameter memory 20 with a database 13. For this, the mobile unit is connected with the database 13, for instance, via the fourth interface S4, a USB connection or a wireless interface.

As already mentioned, the parametering of the sensor 2 can be performed via the mobile unit 3. Moreover, an option is to conduct a software- and/or firmware update of the sensor 2 or of the transmitter circuit 9 via the mobile unit 3.

The software- and/or firmware update of the sensor 2 is, in such case, performed only indirectly. The data of the software- and/or firmware update are first transferred to the transmitter circuit 9, then the sensor 2 is reconnected and the update performed.

If the sensor 2 is connected to a fieldbus, the mobile unit 3 can set the fieldbus address of the sensor 2, respectively of the transmitter circuit 9.

While the transmitter circuit 9 has a longer lifetime than the sensor 2, nevertheless it can happen that also a transmitter circuit 9 must be replaced. Before the replacement, all parameters located in the memory 17 of a first transmitter circuit 9 can be transferred to a mobile unit 3. Then, a second transmitter circuit 9 is connected.

The parameters can then be transferred from the mobile unit 3 to the second transmitter circuit 9.

In general, the mobile unit 3 is embodied both to transfer parameters to the transmitter circuit 9, as well as also to receive parameters from the transmitter circuit 9.

As already mentioned, also energy transfer occurs via the coupling elements 6, 7. It is in an embodiment, because of this, also possible to supply the mobile unit 3 with energy via the second and fourth interfaces S2, S4.

As an alternative to the transfer of parameters from the mobile unit 3, the transmitter circuit 9 can be populated with parameters in a process remote environment. In this regard, the transmitter circuit 9 is connected via the second interface S2 to a computer or the like, for example, via a corresponding interface, especially a second interface in the form of a USB interface. Transmitter circuit 9 is then also supplied with energy on this path. Alternatively, the energy supply can occur via the mobile unit 3.

The invention claimed is:

1. A method for function setting of a measuring point of process automation technology, said measuring point comprises at least one sensor and a transmitter circuit, and the sensor is connected via the transmitter circuit with a superordinated data processing system, wherein the method comprises the steps of:
   disconnecting the sensor from the transmitter circuit;
   connecting a mobile unit with the transmitter circuit and transferring parameters from the mobile unit into the transmitter circuit;
   disconnecting the mobile unit;
   connecting a, or the, sensor with the transmitter circuit; and
   transferring at least one parameter from the transmitter circuit into the sensor.

2. The method as claimed in claim 1, wherein:
   before transfer from the mobile unit to the transmitter circuit, the parameters are checked against a database.

3. The method as claimed in claim 1, wherein:
   a software and/or firmware update of the transmitter circuit and/or the sensor is performed via the mobile unit.

4. The method as claimed in claim 1, wherein:
   the transmitter circuit is connected with the superordinated data processing system via a fieldbus and a fieldbus address of the transmitter circuit is set via the mobile unit.

5. The method as claimed in claim 1, wherein:
   the parameters are transferred from a first transmitter circuit to a second transmitter circuit by means of the mobile unit.

6. The method as claimed in claim 1, wherein:
   the sensor is embodied to produce a measurement signal correlated with a measured variable and to output the measurement signal via a first interface;
   the transmitter circuit includes a memory, a second interface complementary to the first interface and releasably connected with the first interface, and a third interface embodied for connection to the superordinated data processing system;
   the mobile unit includes a parameter memory for storing parameters and a fourth interface complementary to the second interface and connectable with the second interface; and
   the mobile unit is embodied for transferring the parameters in the parameter memory to the memory in the transmitter circuit and/or for receiving parameters and storing the received parameters in the parameter memory.

7. The method as claimed in claim 6, wherein:
   the mobile unit checks the parameter memory against a database via the fourth interface, a USB interface, or a wireless connection before transferring to said transmitter circuit.

8. The method as claimed in claim 6, wherein:
   the transmitter circuit is configured to process a measurement signal delivered by the sensor to determine, based on the measurement signal, a measured value of the measured variable monitored by the measuring point, and to encode the measured value in a communication protocol, which is forwardable via the third interface.

9. The method as claimed in claim 6, wherein:
   at least the first interface, second interface and fourth interface are inductive interfaces.

10. The method as claimed in claim 6, wherein:
    the third interface is a fieldbus interface that enables transfer of data, including processed measured values, from the transmitter circuit according to a protocol meeting one of the standards HART, PROFIBUS PA, PROFIBUS DB, Foundation Fieldbus, or ModBus.

11. The method as claimed in claim 6, wherein:
    the third interface is embodied to transfer data, including processed measured values, from the transmitter circuit as a 4-20 mA signal.

12. The method as claimed in claim 1, wherein:
    the parameters are measuring-point-specific actuating and/or influencing variables of said sensor, including sensor type, serial number, measurement frequency, measurement time, measuring interval, cleaning cycle, number of permitted cleaning cycles, sterilization cycle, number of permitted sterilization cycles, measured value, input signal, output signal, energy supply, electrical current distribution, tag number, accounting data, cost center, forwarding capable parameters for the superordinated data processing system, or access rights.

13. The method as claimed in claim 1, wherein:
    the sensor and the transmitter circuit are connected via a releasable, plugged connection for transfer of data and energy.

14. The method as claimed in claim 13, wherein:
    the plugged connection includes a sensor-side, primary coupling element and a transmitter circuit-side, secondary coupling element, complementary thereto; and
    the secondary coupling element has a housing, in which the transmitter circuit is disposed.

15. The method as claimed in claim 1, wherein:
    the mobile unit is structured for use in an Ex region.

16. The method as claimed in claim 1, wherein:
the mobile unit includes a communication interface for a radio network.

17. The method as claimed in claim 1, wherein:
the transmitter circuit supplies the mobile unit with energy.

* * * * *

UNITED STATES PATENT AND TRADEMARK OFFICE
CERTIFICATE OF CORRECTION

PATENT NO. : 10,036,659 B2
APPLICATION NO. : 14/519349
DATED : July 31, 2018
INVENTOR(S) : Manfred Jagiella Page 1 of 1

It is certified that error appears in the above-identified patent and that said Letters Patent is hereby corrected as shown below:

At (73) Assignee:
Delete "Conducts" after the words "Endress+Hauser" and prior to the words "GmbH+Co. KG" and insert --Conducta--.

Signed and Sealed this
Second Day of October, 2018

Andrei Iancu
*Director of the United States Patent and Trademark Office*